UNITED STATES PATENT OFFICE.

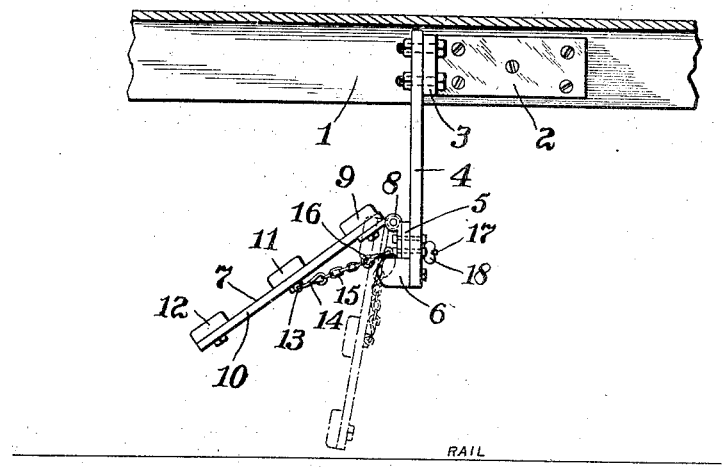
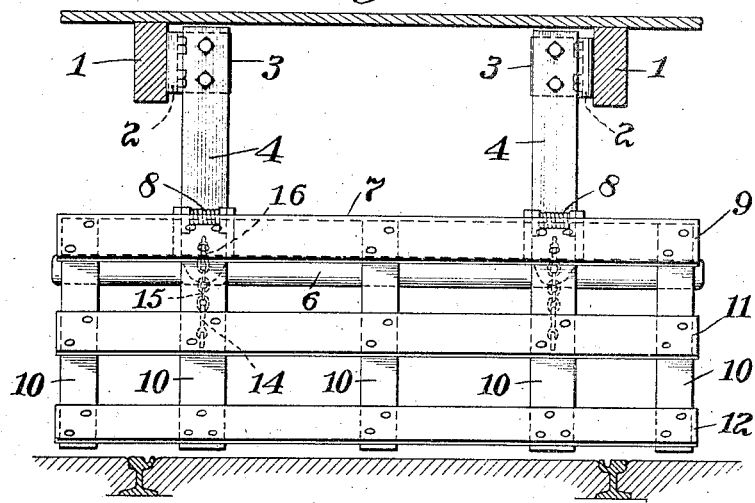
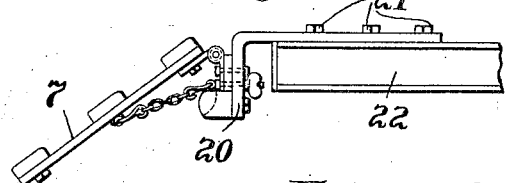
Inventor:
Francis R. McCallin,
by Parker Cook, Atty.

FRANCIS R. McCALLIN, OF LONG ISLAND CITY, NEW YORK.

FENDER.

1,382,302.

Specification of Letters Patent. Patented June 21, 1921.

Application filed April 18, 1921. Serial No. 462,234.

*To all whom it may concern:*

Be it known that I, FRANCIS R. McCALLIN, a citizen of the United States, residing at Long Island City, in the county of Queens and State of New York, have invented certain new and useful Improvements in Fenders, of which the following is a specification.

My invention relates to new and useful improvements in fenders and to that form or style of fender shown in Patent No. 1,266,536 which was granted to me on May 14, 1918.

The present fender, however, is far more simple in construction than the fender above mentioned, the present one calling for a lesser number of parts and naturally taking less time to construct the same.

The principal object of the present invention is to form one that will prevent a person that happens to be struck from being crushed by the trucks or steps or platform of the car, or to prevent the person from passing beneath the wheels. Also to form a fender that will tend to take up a portion of the shock, the fender being provided with springs which are compressed when the body strikes the fender.

Another object of the present invention is to do away with long chains, connections and large springs as used in the former invention, all of which added weight to the fender; also to so construct the present fender that the springs used will be out of the way and need no attention or adjustment.

Still another object of the present invention is to provide adjustable means for positioning the life guard of the fender with regard to the road bed during its running position so that it will be impossible for a body to pass beneath the same if struck by the fender.

Still another object of the invention is to form a fender that is especially adapted for use on electric or trolley cars, and when made on a small scale and with a slightly different form of bracket may be used on trucks or passenger automobiles.

Still another object of the invention is to provide a fender that will be efficient in operation and at the same time exceedingly simple in construction and relatively cheap to manufacture.

With these and other objects in view the invention consists of certain new and novel constructions and combination of parts as will be hereinafter more fully described and pointed out in the claims.

Referring now to the drawings,—

Figure 1 is a side elevation of the fender attached to the sill of a car, the fender being in its operative position and the dotted lines showing the fender swung to the position when struck.

Fig. 2 is a front view of the same; and

Fig. 3 is a side elevation showing a slightly modified form of supporting means.

In the drawings there is shown the sill 1 of a car to which is fastened the brackets 2 which brackets are provided with the lips 3. Securely bolted to the lips of the bracket are the two uprights 4 to which in turn is secured a cross bar 5. Slightly below this cross bar 5 is a somewhat larger cross bar 6 which tends to strengthen the fender and also provides a limit for the inward movement of the swinging portion or life guard 7 of the fender. Secured to the cross bar 5 and preferably opposite the uprights 4 are the heavy spring hinges 8, which as shown are so positioned that as the hinges close, the springs will be compressed.

The outer leaf of these hinges 8 are secured to the upper bar 9 of the life guard 7 and extending from this upper bar 9 are the plurality of parallel bars 10 to which are secured the other two cross bars 11 and 12. To the rear of two of the parallel bars 10 are secured eyelets 13 in which are secured the snap hooks 14 to which in turn are secured a couple of links of a chain 15, and secured through the cross bar 5 and the uprights 4 are the eyelet bolts 16 with the wing nuts 17 thereon, which bolts are provided on their inner ends with snap hooks 18 which in turn hold the inner ends of the chains 15.

This form of connection provides means for adjusting the elevation of the life guard 7. When the fender is in its normal operative position it will assume the position shown in Fig. 1 and by being elevated as shown will not strike any slight projections along the road bed, nor will it strike the road bed due to a jouncing of the car. On the other hand should a body come in contact with the life guard 7, the guard will be forced inwardly and assume the position shown in dotted lines in Fig. 1, the springs or hinges tending to take up a goodly portion of the shock. Furthermore by the life guard swinging downwardly it will prevent the body from rolling beneath the wheels or truck or platform of the car.

In Fig. 3 a slight modification is shown,—in this instance instead of having the uprights 4 secured to the brackets 2, uprights 20 are shown provided with the rearwardly extending arms 21 which may be bolted to the longitudinal frames 22 of a truck or automobile, the remaining portions of the fender being identical.

From the foregoing it will be seen that I have provided a fender comprising a minimum number of parts and wherein the shock will be taken up by the springs in the hinges. At the same time the fender will swing inwardly at its lower end to prevent the body from passing beneath the car. Furthermore, the normal position of the life guard may be adjusted so that it will be out of the way during the ordinary travel of the car.

I have shown the uprights and cross bars formed of flat material although it will be understood that if desired it might be round or of any shape desired.

Having thus described my invention what I desire to secure and claim by Letters Patent is:

1. A fender comprising two uprights, a cross bar connecting the same, a pivotal life guard secured to said cross bar, means for regulating the angle of the life guard and for holding the same in a desired position, spring hinges forming the pivotal connection of the life guard, the springs taking up the shock when said life guard is actuated, and means for limiting the inward pivotal movement of the life guard.

2. A fender comprising two uprights, a cross bar connecting the same, a life guard pivotally connected to said cross bar and normally extending at an angle of 45° to the road bed, means for regulating the angle of the life guard and for holding the same at the desired angle, spring hinges forming the pivotal connection for the life guard, said life guard adapted to swing to substantially a vertical position when struck and the springs compressed, and means in the form of a second cross bar for limiting the inward movement of the life guard after the springs have been fully compressed.

In testimony whereof I affix my signature.

FRANCIS R. McCALLIN.